(12) United States Patent
Lian et al.

(10) Patent No.: US 12,451,536 B2
(45) Date of Patent: Oct. 21, 2025

(54) BATTERY ENERGY PROCESSING APPARATUS AND METHOD, AND VEHICLE

(71) Applicant: BYD COMPANY LIMITED, Guangdong (CN)

(72) Inventors: Yubo Lian, Shenzhen (CN); Heping Ling, Shenzhen (CN); Lei Yan, Shenzhen (CN); Yong Xiong, Shenzhen (CN); Wen Gao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 517 days.

(21) Appl. No.: 18/074,448

(22) Filed: Dec. 2, 2022

(65) Prior Publication Data

US 2023/0097027 A1 Mar. 30, 2023

Related U.S. Application Data

(63) Continuation of application No. PCT/CN2021/098394, filed on Jun. 4, 2021.

(30) Foreign Application Priority Data

Jun. 4, 2020 (CN) .......................... 202010501072.X (51) Int. Cl.
*H01M 10/63* (2014.01)
*H01M 10/44* (2006.01)
*H01M 10/615* (2014.01)
*H02M 7/483* (2007.01)

(52) U.S. Cl.
CPC ......... *H01M 10/63* (2015.04); *H01M 10/443* (2013.01); *H01M 10/615* (2015.04); *H02M 7/4835* (2021.05); *H01M 2220/20* (2013.01)

(58) Field of Classification Search
CPC .. H01M 10/63; H01M 10/615; H01M 10/443; H02M 7/4835
See application file for complete search history.

(56) References Cited

FOREIGN PATENT DOCUMENTS

| CN | 102668229 A | 9/2012 |
|---|---|---|
| CN | 103560304 A | 2/2014 |
| CN | 109823234 A | 5/2019 |
| CN | 109927572 A | 6/2019 |

(Continued)

OTHER PUBLICATIONS

International Search Report and Written Opinion for Application No. PCT/CN2021/098394, mailed on Jul. 29, 2021, 11 pages.

*Primary Examiner* — Sarah A. Slifka
(74) *Attorney, Agent, or Firm* — Sheppard Mullin Richter & Hampton LLP (57) ABSTRACT

The present disclosure belongs to the field of vehicles, and relates to a battery energy processing device and method and a vehicle, which can charge batteries during self-heating of the batteries. The battery energy processing device includes: an energy exchange interface; a first circuit, wherein a first end of the first circuit is connected with the energy exchange interface, and a second end of the first circuit is connected with a battery; a second circuit, wherein a first end of the second circuit is connected with the battery; an energy storage device, connected with a second end of the second circuit; and a controller, configured to: in a first preset state, control the second circuit to charge and discharge the battery to heat the battery, and control the first circuit to receive energy from the energy exchange interface and output the energy to the battery to charge the battery.

20 Claims, 5 Drawing Sheets

(56) References Cited

FOREIGN PATENT DOCUMENTS

| | | |
|---|---|---|
| CN | 210225008 U | 3/2020 |
| CN | 110949157 A | 4/2020 |
| CN | 110962631 A | 4/2020 |
| CN | 110970965 A | 4/2020 |
| CN | 111404246 A | 7/2020 |
| EP | 3330120 A1 | 6/2018 |
| JP | 2010-195081 A | 9/2010 |
| JP | 2014009726 A | 1/2014 |
| JP | 2014072955 A | 4/2014 |
| JP | 2020010517 A | 1/2020 |
| WO | 2012056543 A1 | 5/2012 |
| WO | 2019244680 A1 | 12/2019 |

A second circuit is controlled in a first preset state to charge and discharge a battery to heat the battery — 101

A first circuit 200 is controlled in the first preset state to receive energy from an energy exchange interface 100 and output the energy to the battery 300 to charge the battery 300 — 102

FIG. 13

BATTERY ENERGY PROCESSING APPARATUS AND METHOD, AND VEHICLE

CROSS-REFERENCE TO RELATED APPLICATIONS

The application is a continuation application of International Patent Application No. PCT/CN2021/098394 filed with the China National Intellectual Property Administration (CNIPA) on Jun. 4, 2021, which is based on and claims priority to and benefits of Chinese Patent Application 202010501072.X, filed on Jun. 4, 2020 and entitled "BATTERY ENERGY PROCESSING DEVICE AND METHOD AND VEHICLE". The entire content of the above-referenced applications is incorporated herein by reference.

FIELD

The present disclosure relates to the field of battery technologies, and more specifically, to a battery energy processing device and method and a vehicle.

BACKGROUND

In response to widespread use of new energy, batteries may be used as power sources in various fields. Performance of a battery pack varies with an environment in which the battery pack is used as a power source. For example, at a zero temperature, the charging capacity of the battery decreases with the decrease in the temperature, resulting in a technical problem of low charging efficiency in the low temperature environment.

In order to resolve the low charging efficiency in the low temperature environment, in the related art, a battery heating function is proposed to increase the battery temperature and then perform the battery charging function. However, the current battery heating function and battery charging function are not simultaneously realized. Therefore, simultaneously realizing the battery heating function and the battery charging function is a technical problem urgently to be resolved.

SUMMARY

The present disclosure aims to resolve at least one of the technical problems existing in the related art.

A first objective of the present disclosure is to provide a battery energy processing device.

A second objective of the present disclosure is to provide a battery energy processing method.

A third objective of the present disclosure is to provide a vehicle.

In order to realize the above objectives, a first embodiment of the present disclosure provides a battery energy processing device, including: an energy exchange interface; a first circuit, where a first end of the first circuit is connected with the energy exchange interface, and a second end of the first circuit is connected with a battery; a second circuit, where a first end of the second circuit is connected with the battery; an energy storage device, connected with a second end of the second circuit; and a controller, configured to: in a first preset state, control the second circuit to charge and discharge the battery to heat the battery, and control the first circuit to receive energy from the energy exchange interface and output the energy to the battery to charge the battery.

A second embodiment of the present disclosure provides a battery energy processing method, including: in a first preset state, controlling a second circuit to charge and discharge the battery to heat the battery, and controlling a first circuit to receive energy from an energy exchange interface and output the energy to the battery to charge the battery. A first end of the first circuit is connected with the energy exchange interface, a second end of the first circuit is connected with the battery, a first end of the second circuit is connected with the battery, and an energy storage device is connected with a second end of the second circuit.

A third embodiment of the present disclosure provides a vehicle including a battery and the battery energy processing device according to the first embodiment of the present disclosure.

According to the above technical solutions, during the control of the second circuit to charge and discharge the battery to heat the battery, the first circuit can be controlled to receive the energy from the energy exchange interface to charge the battery. In this way, the battery can be charged during self-heating.

Other features and advantages of the present disclosure will be described in detail in the following detailed description part.

BRIEF DESCRIPTION OF THE DRAWINGS

The accompanying drawings are intended to provide further understanding of the present disclosure and constitute a part of this specification. The accompanying drawings and the specific implementations below are used together for explaining the present disclosure rather than constituting a limitation to the present disclosure. In the accompanying drawings.

DETAILED DESCRIPTION

Specific implementations of the present disclosure are described in detail below with reference to the accompanying drawings. It should be understood that the specific implementations described herein are merely used to describe and explain the present disclosure, but are not intended to limit the present disclosure.

Figure 1:
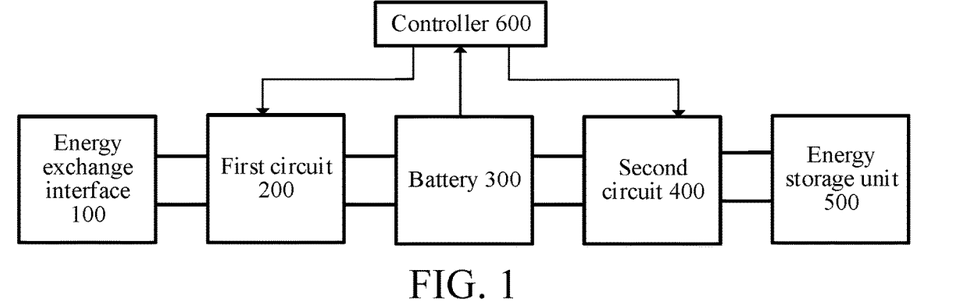
FIG. 1 is a schematic block diagram of a battery energy processing device according to an embodiment of the present disclosure.

As shown in FIG. 1, a battery energy processing device includes: an energy exchange interface 100; a first circuit 200, where a first end of the first circuit 200 is connected with the energy exchange interface 100, and a second end of the first circuit 200 is connected with a battery 300; a second circuit 400, where a first end of the second circuit 400 is connected with the battery 300; an energy storage device 500, where the energy storage device 500 is connected with a second end of the second circuit 400; and a controller 600, configured to: in a first preset state, control the second circuit 400 to charge and discharge the battery 300 to heat the battery 300, and control the first circuit 200 to receive energy from the energy exchange interface 100 and output the energy to the battery to charge the battery 300.

According to the above technical solutions, during the control of the second circuit 400 to charge and discharge the battery 300 to heat the battery 300, the first circuit 200 can be controlled to receive the energy from the energy exchange interface 100 to charge the battery 300. In this way, the battery can be charged during self-heating of the battery.

In a specific embodiment, in the first preset state, the controller 600 controls the second circuit 400 to charge and discharge the energy storage device 500 and the battery 300 to heat the battery 300. The above charging and discharging of the energy storage device 500 and the battery 300 means that the battery provides energy to the energy storage device 500 to discharge the battery 300 and the energy storage device 500 provides energy to the battery 300 to charge the battery 300.

In an embodiment, the first circuit 200 is configured to: in the first preset state, stabilize a voltage of the energy exchange interface 100 and cause a voltage transmitted by the first circuit 200 to the battery 300 to match a voltage of the battery 300 in real time.

In the present disclosure, the first preset state is a state in which the battery 300 can be charged during self-heating.

The above technical solution can realize the following beneficial effects: Although the operation of controlling the second circuit 400 so that the energy storage device 500 and the battery 300 are charged and discharged (that is, a self-heating operation of the battery 300) causes the voltage across the battery 300 to fluctuate, the impact of the voltage fluctuation across the battery on the voltage at the energy exchange interface 100 can be avoided by controlling the first circuit 200 to stabilize the voltage of the energy exchange interface 100. In addition, since the voltage transmitted from the first circuit 200 to the battery 300 matches the voltage of the battery 300 in real time, the voltage transmitted from the first circuit 200 to the battery 300 tracks the voltage of the battery 300 in real time, which avoids a charging failure caused by a failure of tracking the battery voltage. In this way, the battery can be charged during the self-heating.

Since the first circuit 200 is configured to stabilize the voltage of the energy exchange interface 100 in the first preset state, the voltage of the energy exchange interface 100 is prevented from being affected by a large jump in the voltage across the battery during the self-heating of the battery. Since the first circuit 200 is configured to cause the input voltage of the battery 300 to match the voltage of the battery 300 in real time in the first preset state, so that the battery voltage can be tracked in real time, thereby avoid the charging failure caused by the failure of tracking the battery voltage, such as an exit charging process of a charging pile.

Figure 2:
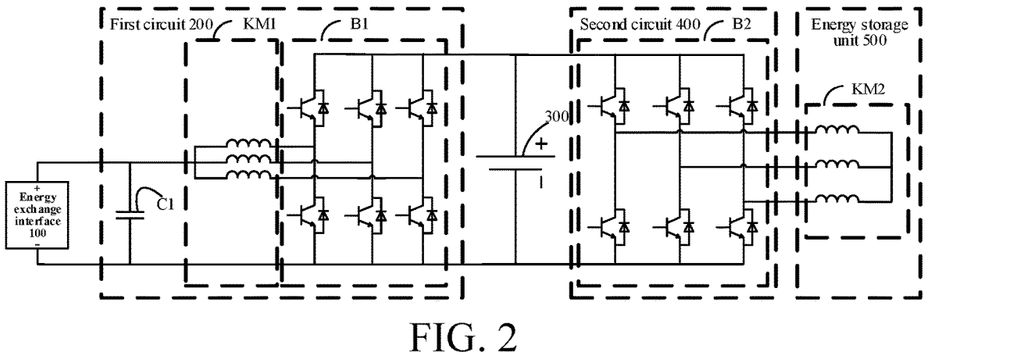
FIG. 2 is another schematic block diagram of a battery energy processing device according to an embodiment of the present disclosure.

As shown in FIG. 2, the first circuit 200 includes: M-phase bridge arms B1, where a first confluent end of the M-phase bridge arms B1 is connected with a positive electrode of the battery 300, and a second confluent end of the M-phase bridge arms B1 is connected with a negative electrode of the battery 300; M coils KM1, where first ends of the M coils KM1 are connected with midpoints of the M-phase bridge arms B1 in a one-to-one correspondence, and second ends of the M coils KM1 are connected together; and a first capacitor C1, where a first end of the first capacitor C1 is connected with the second ends of the M coils KM1, a second end of the first capacitor C1 is connected with the second confluent end of the M-phase bridge arms B1, and the first end of the first capacitor C1 and the second end of the first capacitor C1 are respectively connected with the energy exchange interface 100. $M \geq 1$.

Although M=3 is exemplified in FIG. 2, those skilled in the art should understand that the number of bridge arms and the number of coils in FIG. 2 are merely examples.

The working principle of the first circuit 200 in the first preset state is described below with reference to FIGS. 3-6.

Figure 3:
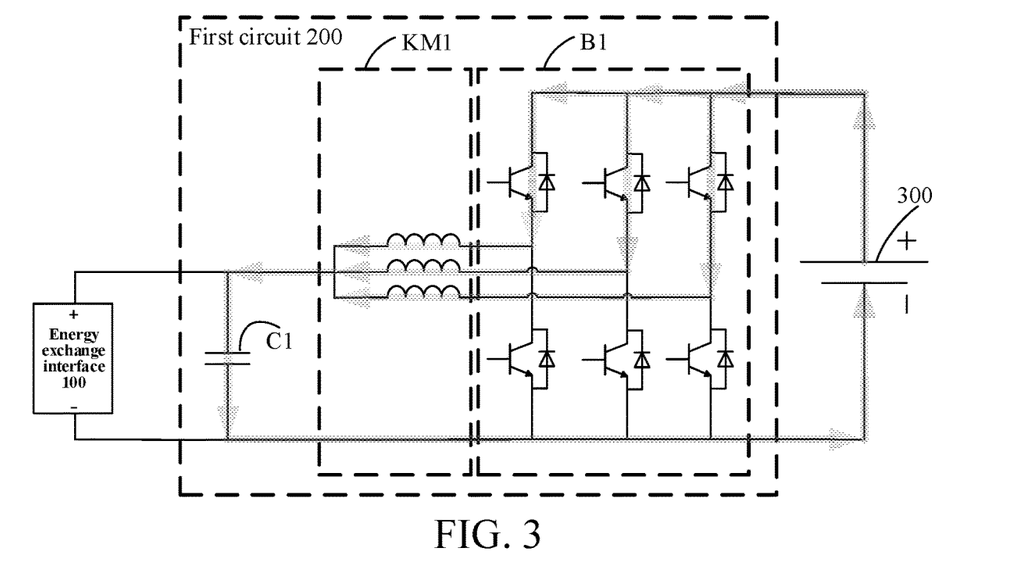
FIGS. 3-6 are schematic diagrams of a working state of a first circuit.

In FIG. 3, the controller 600 controls all lower bridge arms of the M-phase bridge arms B1 to be opened, and controls at least one upper bridge arm of the M-phase bridge arms B1 to be closed. At this time, a current flows from the positive electrode of the battery 300, successively passes through the upper bridge arm of the closed M-phase bridge arms B1, the coils in the M coils KM1 connected with the closed upper bridge arm, and the first capacitor C1, and then returns to the negative electrode of the battery 300. In this way, the battery 300 can charge the first capacitor C1. In addition, controlling the closed number and the closed duty cycle of upper bridge arms may control a value of the charging current, thereby controlling a value of a charging power.

In an example, it is assumed that the M-phase bridge arms B1 include three bridge arms a1, a2, and a3, and the coils KM1 include three coils L1, L2, and L3. One end of the coil L1 is connected with a midpoint of the bridge arm a1, one end of the coil L2 is connected with a midpoint of the bridge arm a2, and the coil L3 is connected with a midpoint of the bridge arm a3. The controller 600 controls all lower bridge arms of the bridge arms a1, a2 and a3 to be opened, controls upper bridge arms of the bridge arms a1 and a2 to be closed, and controls an upper bridge arm of the bridge arm a3 to be opened, so that a cyclic current loop for charging the first capacitor C1 is formed among the positive electrode of the battery 300, the upper bridge arm of the bridge arm a1, the coil L1, the first capacitor C1, and the negative electrode of the battery 300, and a cyclic current loop for charging the first capacitor C1 is formed among the positive electrode of the battery 300, the upper bridge arm of the bridge arm a2, the coil L2, the first capacitor C1, and the negative electrode of the battery 300.

Figure 4:
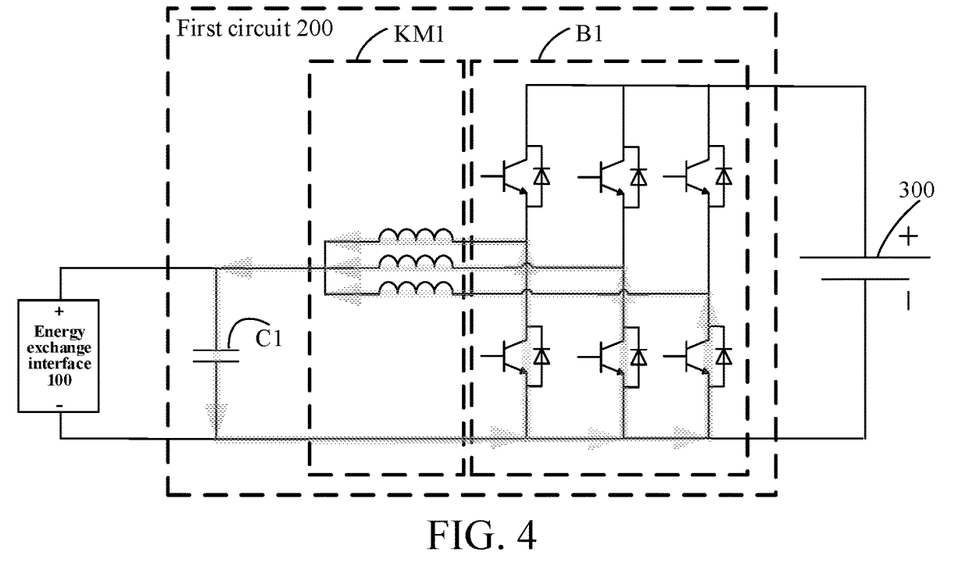

In FIG. 4, the controller 600 then controls all upper bridge arms of the M-phase bridge arms B1 to be opened, and controls a lower bridge arm, of the lower bridge arms of the M-phase bridge arms B1, connected with a coil having a freewheeling current to be closed or opened. At this time, the freewheeling current flows in a loop formed by the closed lower bridge arm, the coil connected with the closed lower bridge arm, and the first capacitor. In this way, the energy in the coil having the freewheeling current can be transferred to the first capacitor C1. It should be noted that, when the lower bridge arm is opened, the current flows through a diode of the lower bridge arm.

Those of ordinary skill in the art that know the following: 1. Upper bridge arms and lower bridge arms of N-phase bridge arms B2 cannot be closed simultaneously. 2. If one of an upper bridge arm and a lower bridge arm is closed, the other is opened. For example, if the upper bridge arm is closed, the lower bridge arm is opened, or if the upper bridge arm is opened, the lower bridge arm is closed. 3. If one of an upper bridge arm and a lower bridge arm is opened, the other may be opened or closed. For example, if the upper bridge arm is opened, the lower bridge arm may be opened or closed, or if the lower bridge arm is opened, the upper bridge arm may be opened or closed.

The above example is still used. Since the upper bridge arms of the bridge arms a1 and a2 are controlled to be closed in the above example, all of the upper bridge arms of the M-phase bridge arms B1 are required to be controlled to be opened and the lower bridge arms of a1 and a2 of the M-phase bridge arms B1 are required to be controlled to be closed, and a lower bridge arm of a3 is required to be controlled to be opened. In this case, a cyclic freewheeling loop for transferring energy in the coil L1 to the first capacitor C1 is formed among the lower bridge arm of the bridge arm a1, the coil L1, and the first capacitor C1, and a cyclic freewheeling loop for transferring energy in the coil L2 to the first capacitor C1 is formed among the lower bridge arm of the bridge arm a2, the coil L2, and the first capacitor C1.

Referring to FIG. 3 and FIG. 4, the first capacitor C1 is pre-charged. Controlling the closed duty cycle of the upper and lower bridge arms of the M-phase bridge arms B1 may keep the voltage at the energy exchange interface 100 stable at a target voltage. The target value may be obtained by reading information (including a voltage level, a maximum output current, and the like) of an external power supply device such as a charging pile.

Figure 5:
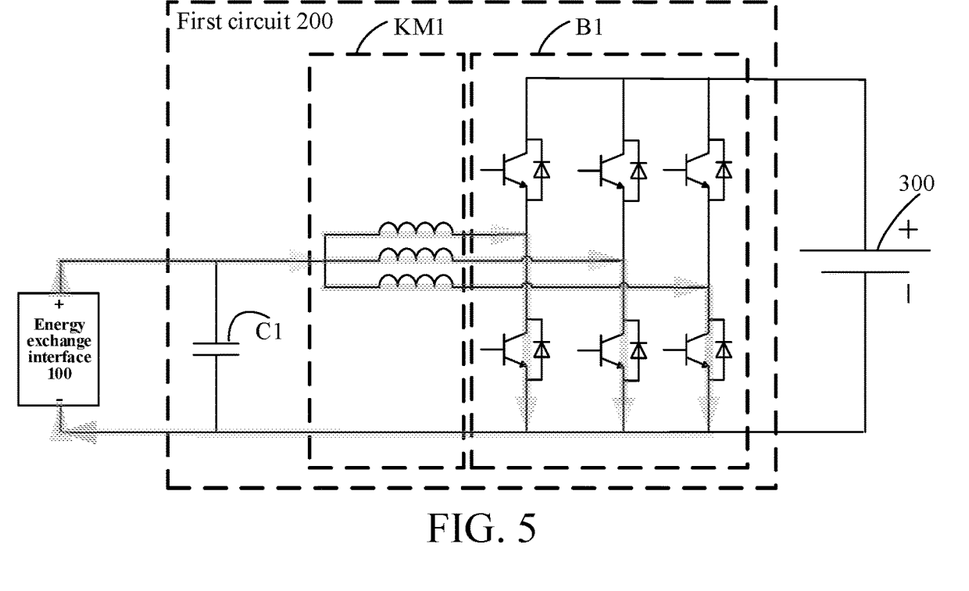

In FIG. 5, the controller 600 controls at least one lower bridge arm of the M-phase bridge arms B1 to be closed, and controls all the upper bridge arms of the M-phase bridge arms B1 to be opened, so that the current flows from the positive electrode of the energy exchange interface 100, successively passes through the coil connected with the closed lower bridge arm and the closed lower bridge arm, and finally returns to the negative electrode of the energy exchange interface 100. In this way, the coil can be charged by an external power supply device such as a charging pile. In addition, controlling the closed number and the closed duty cycle of the lower bridge arms may control a value of the charging current, thereby controlling a value of a charging power.

Figure 6:
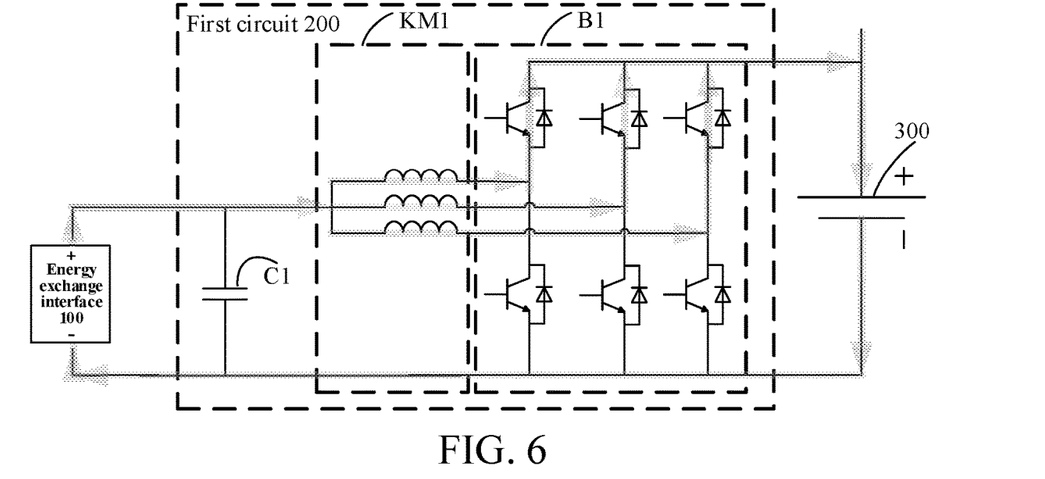

In FIG. 6, the controller 600 controls all lower bridge arms of the M-phase bridge arms B1 to be opened, and controls an upper bridge arm of the M-phase bridge arms B1 connected with a coil having the freewheeling current to be closed or opened, so that the current successively flows through the positive electrode of the energy exchange interface 100, a coil connected with the closed upper bridge arm, the closed upper bridge arm, the positive electrode of the battery 300, and the negative electrode of the battery 300, and finally returns to the negative electrode of the energy exchange interface 100. In this way, the battery 300 can be jointly charged by an external power supply device such as a charging pile and the coil KM1. It should be noted that, when the upper bridge arm is opened, the current flows through a diode of the upper bridge arm.

Therefore, the controller 600 implements a boost chopping function (BOOST) by alternating the states as shown in FIG. 5 and FIG. 6 by controlling opening and closing of the lower bridge arms of the M-phase bridge arms B1, so that the minimum of the average of the voltage outputted to the battery 300 may be the voltage of the energy exchange interface 100. If the duty cycle of the lower bridge arms is increased, the voltage outputted to the battery 300 from the first circuit 200 will increase accordingly. Controlling the closed duty cycle of the upper and lower bridge arms of the M-phase bridge arms B1 may change the voltage outputted by the first circuit 200 to the battery 300, so that the voltage outputted by the first circuit 200 to the battery 300 tracks the voltage of the battery 300 in real time.

Referring to FIG. 2, the second circuit 400 includes N-phase bridge arms B2. A first confluent end of the N-phase bridge arms B2 is connected with the positive electrode of the battery 300. A second confluent end of the N-phase bridge arms B2 is connected with the negative electrode of the battery 300. The energy storage device 500 includes N coils KM2. First ends of the N coils KM2 are connected with midpoints of the N-phase bridge arms B2 in a one-to-one correspondence. Second ends of the N coils KM2 are connected together. N≥1. Although N=3 is exemplified in FIG. 2, those skilled in the art should understand that the number of bridge arms and the number of coils in FIG. 2 are merely examples.

In the first preset state, the controller 600 controls the N-phase bridge arms B2 to cause the N coils KM2 to charge and discharge the battery 300 to heat the battery 300, and controls the M-phase bridge arms B1 to cause the battery 300 to receive the energy from the energy exchange interface 100 to charge the battery 300. In the first preset state, the process of charging the battery 300 by using the first circuit 200 shown in FIG. 2 has been described in detail with reference to FIGS. 3-6. The process of heating the battery 300 by using the N-phase bridge arms B2 and the N coils KM2 in FIG. 2 in the first preset state is subsequently described. Specifically, the coils KM2 are used as a current-limiting buffer device, and controlling a closed mode of the N-phase bridge arms B2 and controlling a phase current of the battery circuit by adjusting the duty cycles of the closed bridges arms cause the internal resistance of the battery to generate heat, so as to drive the temperature of the battery to increase, thereby realizing the controllable temperature increase of the battery 300.

In an embodiment, the N coils KM2 are motor windings (for example, motor windings for a driving motor), and the N-phase bridge arms B2 are bridge arm converters. That is to say, the existing motor windings and bridge arm converters on the vehicle are multiplexed, so that different functions can be realized. For example, when the battery requires self-heating, the N coils KM2 and the N-phase bridge arms B2 can be used in various self-heating processes described in the present disclosure. When the vehicle requires driving, the N coils KM2 and the N-phase bridge arms B2 can be switched to controlling the bridge arms B2 to cause the motor corresponding to the motor windings to output power to drive the vehicle, that is, the controller 600 is further configured to: in a fourth preset state, control the bridge arm converters to cause the motor corresponding to the motor windings to output power. The fourth preset state is a motor driving state. In this way, different functions can be realized as required by multiplexing the motor windings and the bridge arm converters of the vehicle, and the vehicle costs are reduced.

Figure 7:
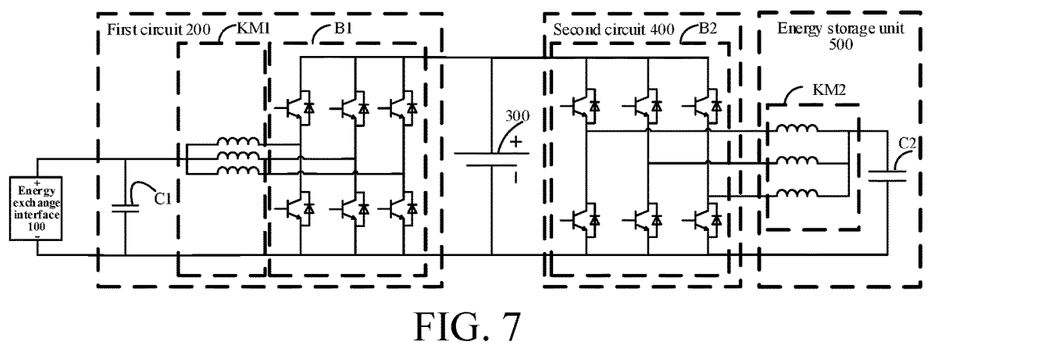
FIG. 7 is another schematic block diagram of a battery energy processing device according to an embodiment of the present disclosure.

FIG. 7 is another schematic block diagram of a battery energy processing device according to an embodiment of the present disclosure. As shown in FIG. 7, the energy storage device 500 further includes a second capacitor C2. A first end of the second capacitor C2 is connected with the second ends of the N coils KM2, and a second end of the second capacitor C2 is connected with the second confluent end of the N-phase bridge arms B2. Using the circuit topology of FIG. 7 can charge the battery 300 in the first preset state during the heating of the battery 300. That is to say, in the first preset state, the controller 600 controls the N-phase bridge arms B2 to cause the second capacitor C2 to charge and discharge the battery 300 to heat the battery 300, and controls the M-phase bridge arms B1 to cause the battery 300 to receive the energy from the energy exchange interface 100. In the first preset state, the process of charging the battery 300 by using the first circuit 200 shown in FIG. 7 has been described in detail with reference to FIGS. 3-6. In the first preset state, the process of heating the battery 300 by using the N-phase bridge arms B2, the N coils KM2, and the second capacitor C2 in FIG. 7 is subsequently described.

In a first process, the controller 600 may control all lower bridge arms of the N-phase bridge arms B2 to be opened, and control at least one upper bridge arm of the N-phase bridge arms B2 to be closed. As this time, a current flows from the positive electrode of the battery 300, passes through the closed upper bridge arm, a coil connected with the closed upper bridge arm, and the second capacitor C2, and finally returns to the negative electrode of the battery 300. In the process, the battery 300 is in a discharging state, and the second capacitor C2 receives the energy from the coil connected with the closed upper bridge arm, so that the voltage continuously increases, thereby realizing energy storage.

In a second process, the controller 600 may control all upper bridge arms of the N-phase bridge arms B2 to be opened, and control a lower bridge arm of the lower bridge arms of the N-phase bridge arms B2 connected with a coil having a freewheeling current to be closed. At this time, a current flows from the coil having the freewheeling current, passes through the second capacitor C2 and the closed lower bridge arm, and finally returns to the coil having the freewheeling current. In the process, due to the freewheeling effect of the coil, the second capacitor C2 continues to receive the energy from the coil, so that the voltage continuously increases.

In a third process, as the voltage across the second capacitor C2 continuously increases, the second capacitor C2 automatically transform from receiving the energy from the coils KM2 to releasing energy to the coils KM2. At this time, the current flows from the second capacitor C2, passes through the coil connected with the closed lower bridge arm, and the closed lower bridge arm, and finally returns to the second capacitor C2. In the process, the voltage across the second capacitor C2 continuously decreases.

In a fourth process, the controller 600 may control all lower bridge arms of the N-phase bridge arms B2 to be opened, and control at least one upper bridge arm of the N-phase bridge arms B2 to be closed. At this time, a current flows from the second capacitor C2, passes through the coil connected with the closed upper bridge arm, the closed upper bridge arm, the positive electrode of the battery 300, and the negative electrode of the battery 300, and finally returns to the second capacitor C2. In the process, the battery 300 is in a charging state.

As the voltage across the second capacitor C2 continuously decreases, the second capacitor C2 and the coil connected with the closed upper bridge arm switch from releasing energy to the battery to receiving energy from the battery. At this time, the current flowing direction returns to the flowing direction described in the first process, and the battery 300 starts to be discharged.

The above four processes are continuously repeated so that cyclic charging/discharging can be quickly performed between the second capacitor C2 and the battery 300. Due to the existence of internal resistance of the battery, a large amount of heat is generated to fast heat up the battery, so as to improve the heating efficiency of the battery.

Figure 8:
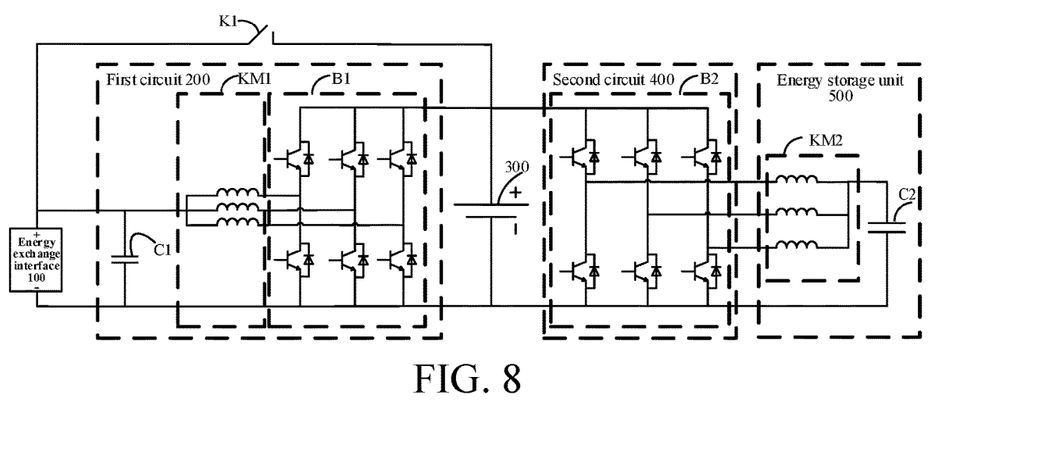
FIG. 8 is another schematic block diagram of a battery energy processing device according to an embodiment of the present disclosure.

FIG. 8 is another schematic block diagram of a battery energy processing device according to an embodiment of the present disclosure. As shown in FIG. 8, the battery energy processing device further includes a first switch K1. A first end of the first switch K1 is connected with the energy exchange interface 100, and a second end of the first switch K1 is connected with the positive electrode of the battery 300. The controller 600 is further configured to: in a second preset state, control the first circuit 200 to be in a state of not receiving the energy from the energy exchange interface 100 and control the second circuit 400 to be in a state of not charging and discharging the energy storage device 500 and the battery 300, and control the first switch K1 to be closed to cause the battery 300 to receive the energy from the energy exchange interface 100 directly. In this way, fast charging can be realized with the lowest charging energy consumption. Therefore, the battery 300 can be directly charged without self-heating of the battery.

In the present disclosure, the second preset state is a state of directly charging the battery without self-heating of the battery.

It may be understood that, arranging the first switch K1 on the battery energy processing device in the present disclosure realizes two charging manners in the present disclosure. A first charging manner is boost charging through the first circuit 200, and a second charging manner is direct charging through the first switch K1. The two charging manners are not performed in parallel. During the charging and discharging between the energy storage device 500 and the battery 300 to realize self-heating of the battery 300, the first switch K1 needs to be opened to avoid direct charging during the self-heating. Moreover, if the battery 300 needs to be charged during the self-heating, boost charging needs to be performed on the battery 300 through the first circuit 200. When the energy storage device 500 and the battery 300 are not charged and discharged to heat the battery 300, if the battery 300 needs to be charged, since there is no voltage fluctuation across the battery 300 caused by self-heating, boost charging may be performed on the battery 300 by using the first circuit 200, or the first switch K1 may be closed to directly charge the battery 300.

Figure 9:
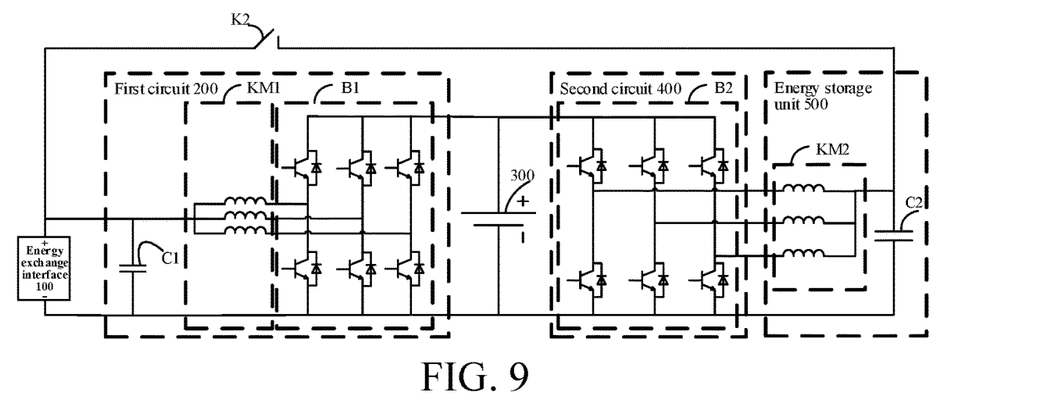
FIG. 9 is another schematic block diagram of a battery energy processing device according to an embodiment of the present disclosure.

As shown in FIG. 9, the battery energy processing device further includes a second switch K2. A first end of the second switch K2 is connected with the energy exchange interface 100, and a second end of the second switch K2 is respectively connected with the first end of the second capacitor C2 and the second ends of the N coils KM2. The controller 600 is further configured to: in a third preset state, control the second switch K2 to be closed, and control lower bridge arms of the N-phase bridge arms B2 to be closed and opened, to cause the battery 300 to receive the energy from the energy exchange interface 100. The energy from the energy exchange interface 100 is boosted after passing through the N-phase bridge arms B2, the N coils KM2, and the second capacitor C2 and then received by the battery 300. Therefore, the battery 300 can be charged through fast boost charging without self-heating of the battery.

In the present disclosure, the third preset state is a state of charging the battery 300 through fast boost charging without self-heating of the battery. In addition, a process of performing fast boost charging on the battery 300 by using the second circuit 400 and the energy storage device 500 when the second switch K2 is closed is similar to the process described with reference to FIGS. 3-6. Therefore, details are not described in detail herein.

In another embodiment of the present disclosure, the topology of FIG. 9 can further charge the battery 300 directly without self-heating of the battery. Specifically, the controller 600 is further configured to: in the second preset state, control the second switch K2 to be closed, control the lower bridge arms of the N-phase bridge arms B2 to be opened, and control the upper bridge arms of the N-phase bridge arms B2 to be closed or opened. At this time, the energy from the energy exchange interface 100 passes through the N coils KM2 and the upper bridge arms of the N-phase bridge arms B2 and then flows to the positive electrode of the battery 300 to charge the battery, that is, cause the battery 300 to directly receive the energy from the energy exchange interface 100. It should be noted that when the upper bridge arms of the N-phase bridge arms B2 are opened, the current flows through diodes of the upper bridge arms of the N-phase bridge arms B2. The second preset state is a state of directly charging the battery without self-heating of the battery.

Those of ordinary skill in the art that know the following: 1. Upper bridge arms and lower bridge arms of N-phase bridge arms B2 cannot be closed simultaneously. 2. If one of an upper bridge arm and a lower bridge arm is closed, the other is opened. For example, if the upper bridge arm is closed, the lower bridge arm is opened, or if the upper bridge arm is opened, the lower bridge arm is closed. 3. If one of an upper bridge arm and a lower bridge arm is opened, the other may be opened or closed. For example, if the upper bridge arm is opened, the lower bridge arm may be opened or closed, or if the lower bridge arm is opened, the upper bridge arm may be opened or closed.

In addition, it can be learned from the circuit topology shown in FIG. 9 that the second circuit 400 and the energy storage device 500 are multiplexed for heating the battery 300 and performing fast boost charging on the battery 300. The two operations are switched through the second switch K2. That is to say, when the second switch K2 is opened, the second circuit 400 and the energy storage device 500 can be used for heating the battery 300, and when the second switch K2 is closed, the second circuit 400 and the energy storage device 500 can be used for realize fast boost charging of the battery 300 or realize direct charging of the battery.

In addition, it may be understood that, arranging the second switch K1 on the battery energy processing device in the present disclosure realizes four charging manners in the present disclosure. A first charging manner is boost charging through the first circuit 200, a second charging manner is direct charging through the first switch K1, a third charging manner is boost charging through the second switch K2, the second capacitor C2, the N-phase bridge arms B2, and the N coils KM2, and a fourth charging manner is direct charging through the second switch K2, the second capacitor C2, the N-phase bridge arms B2, and the N coils KM2. The first, second, and third charging manners are not performed in parallel. During the charging and discharging between the energy storage device 500 and the battery 300 to realize self-heating of the battery 300, the first switch K1 and the second switch K2 need to be opened to avoid direct charging during the self-heating. Moreover, if the battery 300 needs to be charged during the self-heating, boost charging needs to be performed through the first circuit 200. When the energy storage device 500 does not charge and discharge the battery 300 to heat the battery 300, if the battery 300 needs to be charged, since there is no voltage fluctuation across the battery 300 caused by self-heating, the first switch K1 may be closed, the second switch K2 may be opened, and the first circuit 200 may be opened to directly charge the battery 300; or the first switch K1 may be opened, the first circuit 200 may be opened, and the second switch K2 may be closed to perform fast boost charging on the battery 300 through the second capacitor C2, the N-phase bridge arms B2, and the N coils KM2; or the first switch K1 and the second switch K2 may be opened to perform fast boost charging on the battery 300 through the first circuit 200. One of the charging manners may be selected according to a voltage of a charging pile. When the voltage of the charging pile satisfies a charging voltage requirement, direct charging may be selected to realize fast charging with the lowest charging energy consumption. When the voltage of the charging pile does not satisfy the voltage requirements for direct charging, the second switch K2, the second capacitor C2, the N-phase bridge arms B2, and the N coils KM2 may be used for fast boost charging, or the first circuit 200 may be used for boost charging.

In addition, if the energy storage device 500 is required to charge and discharge the battery 300 to realize self-heating of the battery 300, it means that the battery 300 is currently in a low temperature state. Therefore, in the present disclosure, a current during the boost charging of the battery 300 by using the first circuit 200 needs to be less than a current that may damage the battery during charging of the battery at a low temperature, which means that the current for boost charging by using the first circuit 200 cannot be too high. Therefore, in a case that self-heating of the battery through the N-phase bridge arms B2, the N coils KM2, and the second capacitor C2 is not required, if boost charging of the battery 300 is required, fast boost charging of the battery 300 through the second switch K2, the N-phase bridge arms B2, the N coils KM2, and the second capacitors C2 is preferentially used. A fast boost charging circuit composed of the second switch K2, the N-phase bridge arms B2, the N coils KM2, and the second capacitor C2 is configured to perform fast boost charging on the battery with a large current.

Figure 10:
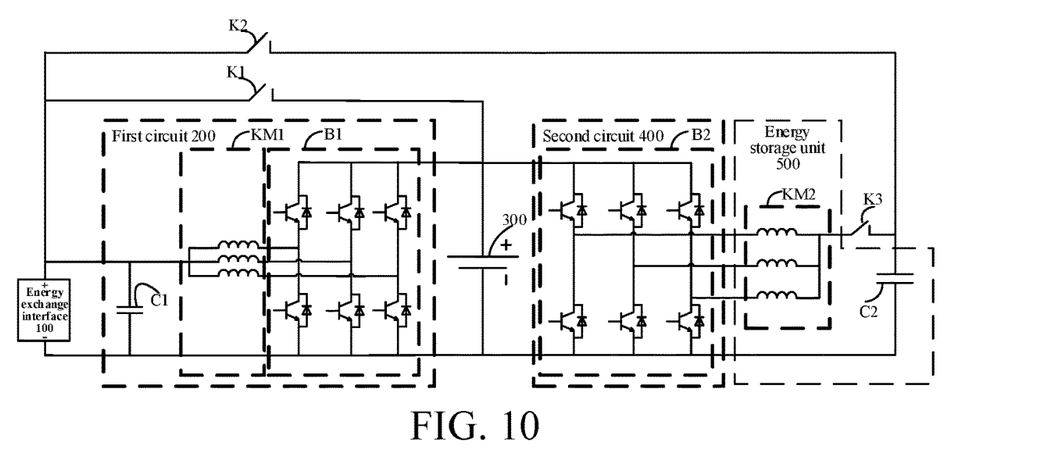
FIG. 10 is another schematic block diagram of a battery energy processing device according to an embodiment of the present disclosure.

FIG. 10 is another schematic block diagram of a battery energy processing device according to an embodiment of the present disclosure. As shown in FIG. 10, the battery energy processing device further includes a third switch K3. A first end of the third switch K3 is connected with the second ends of the N coils KM2, and a second end of the third switch K3 is connected with the first end of the second capacitor C2.

If the battery 300 requires self-heating, the third switch K3 may be opened, and the battery 300 is cyclically charged and discharged by using the N-phase bridge arms B2 and the N coils KM2, so as to realize the self-heating of the battery 300 through heating of the internal resistance of the battery 300. Alternatively, if the battery 300 requires self-heating, the third switch K3 may be closed, the second switch K2 may be opened, and the battery 300 is cyclically charged and discharged by using the N-phase bridge arms B2, the N coils KM2, and the second capacitor C2, so as to realize the self-heating of the battery 300 through heating of the internal resistance of the battery 300. The workflows of the self-heating have been described in detail above and therefore are not repeated herein.

If the battery 300 does not require self-heating but requires fast boost charging, the second switch K2 and the third switch K3 may be closed, so as to perform fast boost charging on the battery 300 by using the N-phase bridge arms B2, the N coils KM2, and the second capacitor C2. In addition, the coordination among direct charging, fast boost charging, boost charging through the first circuit 200, and battery heating have been described in detail with reference to FIG. 9, and therefore are not repeated herein.

In an embodiment, the N coils KM2 are motor windings (for example, motor windings for a driving motor), and the N-phase bridge arms B2 are bridge arm converters. That is to say, the existing motor windings and bridge arm converters on the vehicle are multiplexed, so that different functions can be realized as required. For example, when the battery requires self-heating, the third switch K3 may be opened to implement the relevant self-heating process described in the present disclosure by using the N coils KM2 and the N-phase bridge arms B2, or the third switch K3 may be closed to implement the related self-heating process described in the present disclosure by using the N coils KM2, the N-phase bridge arms B2, and the second capacitor C2. When the battery requires fast boost charging, the N coils KM2 and the N-phase bridge arms B2 may be switched to be used in the fast boost charging process described above. When the vehicle requires driving, the third switch K3 may be opened, so that the N coils KM2 and the N-phase bridge arms B2 can be switched to controlling the bridge arms B2 to cause the motor corresponding to the motor windings to output power to drive the vehicle. That is, the controller 600 is further configured to: in a fifth preset state, control the third switch K3 to be opened, and control the bridge arm converters to cause the motor corresponding to the motor windings to output power. The fifth preset state is a motor driving state. In this way, different functions can be realized as required by multiplexing the motor windings and the bridge arm converters of the vehicle, and the vehicle costs are reduced.

Figure 11:
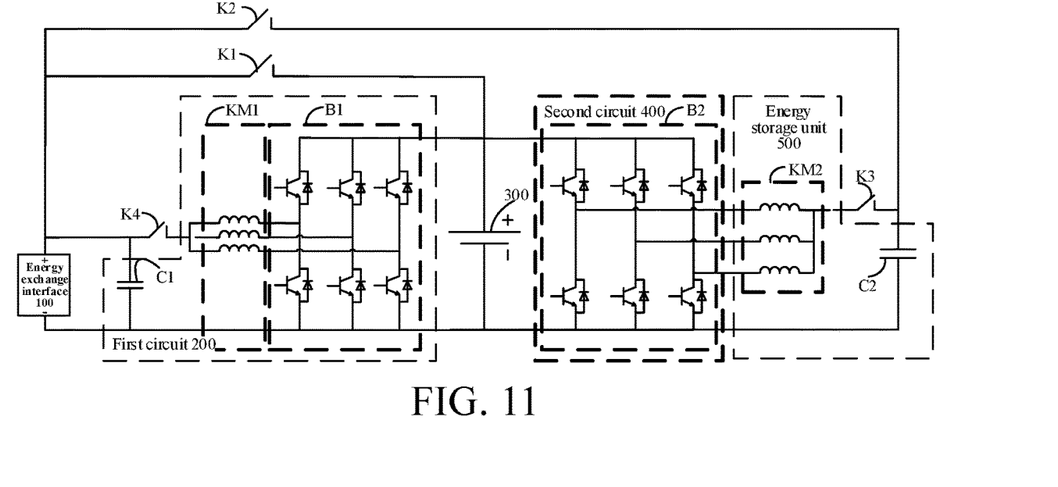
FIG. 11 is another schematic block diagram of a battery energy processing device according to an embodiment of the present disclosure.

FIG. 11 is another schematic block diagram of a battery energy processing device according to an embodiment of the present disclosure. As shown in FIG. 11, the battery energy processing device further includes a fourth switch K4. A first end of the fourth switch K4 is connected with the second ends of the M coils KM1, and a second end of the fourth switch K4 is connected with the first end of the first capacitor C1. When the fourth switch K4 is closed, the above boost charging may be performed on the battery 300 by using the first circuit 200. When the fourth switch K4 is opened, the first circuit 200 may be used in functions other than boost charging of the battery 300, for example, used as a driving circuit. Therefore, arranging the fourth switch K4 can realize a second function of the first circuit 200 without affecting other functions of the battery energy processing device of the present disclosure such as battery self-heating, the boost charging function of the battery self-heating circuit, direct battery charging, and battery driving.

For example, in an embodiment, the M coils KM1 may be motor windings of a driving motor, and the M-phase bridge arms B1 may be bridge arm converters. In this case, the controller 600 may be configured to: in a sixth preset state, control the fourth switch K4 to be opened, and control the bridge arm converters to cause the motor corresponding to the motor windings to output power, thereby realizing a motor driving function. The sixth preset state is a motor driving state. Multiplexing the motor windings and the bridge arm converters can reduce the vehicle costs.

In another example, the M coils KM1 are motor windings of a compressor, and the M-phase bridge arms B1 are bridge arm converters. The first switch K4 is controlled to be opened, so that the M coils KM1 and the M-phase bridge arms B1 can be used to realize common functions of the compressor such as a refrigeration function. Multiplexing the motor windings and the bridge arm converters can reduce the vehicle costs. In addition, since a driving current of the compressor is not large, the motor windings of the compressor and the bridge arm converters can be multiplexed in the first circuit 200, so that a small current can be used for the above boost charging of the battery when the battery is charged during the self-heating.

In addition, when the M coils KM1 and the M-phase bridge arms B1 are used for the vehicle driving function, the above fast boost charging, direct charging, battery heating, motor driving, and the like may be performed as required. When the N coils KM2 and the N-phase bridge arms B2 are used for the vehicle driving function, the above direct charging, boost charging through the first circuit 200, the compressor function, and the like may be performed as required.

Figure 12:
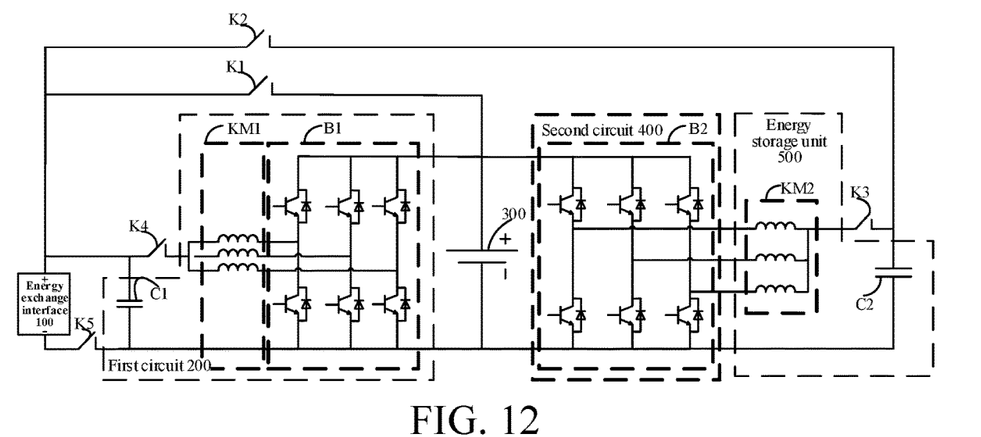
FIG. 12 is another schematic block diagram of a battery energy processing device according to an embodiment of the present disclosure.

FIG. 12 is another schematic block diagram of a battery energy processing device according to an embodiment of the present disclosure. As shown in FIG. 12, the battery energy processing device further includes a fifth switch K5. A first end of the fifth switch K5 is connected with the energy exchange interface 100, and a second end of the fifth switch K5 is connected with the negative electrode of the battery 300. The controller 600 is further configured to control, in the first preset state, the second preset state, or the third preset state, the fifth switch K5 to be closed. In this way, after the charging is ended, the first circuit 200 can be completely isolated from the energy exchange interface 100 to prevent a personal safety problem caused by a person touching the energy exchange interface 100 when the high voltage of the first circuit 200 is connected in series with the energy exchange interface 100.

Figure 13:
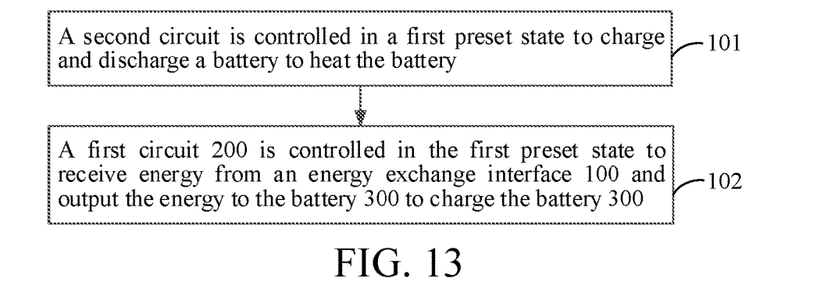
FIG. 13 is a flowchart of a battery energy processing method according to an embodiment of the present disclosure.

FIG. 13 is a flowchart of a battery energy processing method according to an embodiment of the present disclosure. As shown in FIG. 13, the method includes the following steps:

Step S101: A second circuit 400 is controlled in a first preset state to charge and discharge a battery 300 to heat the battery 300.

Step S102: A first circuit 200 is controlled in the first preset state to receive energy from an energy exchange interface 100 and output the energy to the battery 300 to charge the battery 300.

A first end of the first circuit 200 is connected with the energy exchange interface 100, a second end of the first circuit 200 is connected with the battery 300, a first end of the second circuit 400 is connected with the battery 300, and an energy storage device 500 is connected with a second end of the second circuit 400.

In addition, the present disclosure does not limit the order of step S101 or step S102. That is to say, for example, if it is detected that the battery requires self-heating and charging, step S101 may be first performed and then step S102 is performed, or step S102 may be first performed and then step S101 is performed, or step S101 and step S102 may be performed simultaneously. Certainly, if it is detected that the battery requires self-heating during battery charging, step S101 may be directly performed to heat the battery. If it is detected that the battery requires charging during battery self-heating, step S102 may be directly performed to charge the battery.

According to the above technical solutions, during the control of the second circuit 400 to charge and discharge the battery 300 to heat the battery 300, the first circuit 200 can be controlled to receive the energy from the energy exchange interface 100 to charge the battery 300. In this way, the battery can be charged during self-heating of the battery.

In a specific embodiment, in the first preset state, the controller 600 controls the second circuit 400 to cause the energy storage device 500 and the battery 300 to be charged and discharged to heat the battery 300. The above charging and discharging of the energy storage device 500 and the battery 300 means that the battery provides energy to the energy storage device 500 to discharge the battery 300 and the energy storage device 500 provides energy to the battery 300 to charge the battery 300.

Optionally, the first circuit 200 is controlled in the first preset state to stabilize a voltage of the energy exchange interface 100 and cause a voltage transmitted by the first circuit 200 to the battery 300 to match a voltage of the battery 300 in real time.

Optionally, the first circuit 200 includes: M-phase bridge arms B1, where a first confluent end of the M-phase bridge arms B1 is connected with a positive electrode of the battery 300, and a second confluent end of the M-phase bridge arms B1 is connected with a negative electrode of the battery 300; M coils KM1, where first ends of the M coils KM1 are connected with midpoints of the M-phase bridge arms B1 in a one-to-one correspondence, and second ends of the M coils KM1 are connected together; and a first capacitor C1, where a first end of the first capacitor C1 is connected with the second ends of the M coils KM1, and a second end of the first capacitor C1 is connected with the second confluent end of the M-phase bridge arms B1. M≥1.

The step of controlling, in first preset state, the first circuit 200 to receive the energy from the energy exchange interface 100 and output the energy to battery 300 to charge the battery 300 includes: controlling the M-phase bridge arms B1 to cause the battery 300 to receive the energy from the energy exchange interface 100.

Optionally, the second circuit 400 includes N-phase bridge arms B2, where a first confluent end of the N-phase bridge arms B2 is connected with the positive electrode of the battery 300, and a second confluent end of the N-phase bridge arms B2 is connected with the negative electrode of the battery 300. The energy storage device 500 includes N coils KM2 and a second capacitor C2, first ends of the N coils KM2 are connected with midpoints of the N-phase bridge arms B2 in a one-to-one correspondence, second ends of the N coils KM2 are connected together, a first end of the second capacitor C2 is connected with second ends of the N coils KM2, a second end of the second capacitor C2 is connected with the second confluent end of the N-phase bridge arms B2, and N≥1.

Therefore, in the first preset state, the step of controlling the second circuit 400 to charge and discharge the energy storage device 500 and the battery 300 to heat the battery 300 includes: controlling the N-phase bridge arms B2 to cause the second capacitor C2 to charge and discharge the battery 300 to heat the battery 300.

Optionally, in a second preset state, the first circuit 200 is controlled to be in a state of not receiving the energy from the energy exchange interface 100, the second circuit 400 is controlled to be in a state of not charging and discharging the energy storage device 500 and the battery 300, and the first switch K1 is controlled to be closed so that the battery 300 directly receives the energy from the energy exchange interface 100. A first end of the first switch K1 is connected with the energy exchange interface 100, and a second end of the first switch K1 is connected with the positive electrode of the battery 300.

Optionally, in a third preset state, the second switch K2 is controlled to be closed, and lower bridge arms of the N-phase bridge arms B2 are controlled so that the battery 300 receives the energy from the energy exchange interface 100. The energy from the energy exchange interface 100 is boosted after passing through the N-phase bridge arms B2, the N coils KM2, and the second capacitor C2 and then received by the battery 300. A first end of the second switch K2 is connected with the energy exchange interface 100, and a second end of the second switch K2 is respectively connected with the first end of the second capacitor C2 and the second ends of the N coils KM2.

Optionally, in the second preset state, the second switch K2 is controlled to be closed, and the lower bridge arms of the N-phase bridge arms B2 are controlled so that the battery 300 directly receives the energy from the energy exchange interface 100. The first end of the second switch K2 is connected with the energy exchange interface 100, and the second end of the second switch K2 is respectively connected with the first end of the second capacitor C2 and the second ends of the N coils KM2.

Optionally, in a fifth preset state, a third switch K3 is controlled to be opened, and bridge arm converters are controlled so that a motor corresponding to motor windings outputs power. A first end of the third switch K3 is connected with the second ends of the N coils KM2, a second end of the third switch K3 is connected with the first end of the second capacitor C2, the N coils KM2 are the motor windings, and the N-phase bridge arms B2 are the bridge arm converters.

Optionally, in a sixth preset state, a fourth switch K4 is controlled to be opened, and bridge arm converters are controlled so that a motor corresponding to motor windings outputs power. A first end of the fourth switch K4 is connected with the second ends of the M coils KM1, a second end of the fourth switch K4 is connected with the first end of the first capacitor C1, the M coils KM1 are the motor windings, and the M-phase bridge arms B1 are the bridge arm converters.

Optionally, the second circuit 400 includes N-phase bridge arms B2, where a first confluent end of the N-phase bridge arms B2 is connected with the positive electrode of the battery 300, and a second confluent end of the N-phase bridge arms B2 is connected with the negative electrode of the battery 300. The energy storage device 500 includes N coils KM2, first ends of the N coils KM2 are connected with midpoints of the N-phase bridge arms B2 in a one-to-one correspondence, second ends of the N coils KM2 are connected together, and N≥1.

In the first preset state, the N-phase bridge arms B2 are controlled to cause the N coils KM2 to charge and discharge the battery 300 to heat the battery 300, and the M-phase bridge arms B1 are controlled so that the battery 300 receives the energy from the energy exchange interface 100.

Optionally, the method further includes: controlling, in a fourth preset state, bridge arm converters so that a motor corresponding to motor windings outputs power. The N coils KM2 are the motor windings, and the N-phase bridge arms B2 are the bridge arm converters.

The specific implementation of each step in the battery energy processing method according to the embodiments of the present disclosure has been described in detail in the battery energy processing device according to the embodiments of the present disclosure, and therefore is not repeated herein.

Another embodiment of the present disclosure provides a vehicle including a battery and the battery energy processing device according to the embodiments of the present disclosure.

Specifically, implementations of the present disclosure are described in detail above with reference to the accompanying drawings, but the present disclosure is not limited to the specific details in the above implementations. Various simple variations may be made to the technical solutions of the present disclosure within the scope of the technical idea of the present disclosure, and such simple variations shall all fall within the protection scope of the present disclosure.

It should be additionally noted that, the specific technical features described in the foregoing specific implementations may be combined in any proper manner in a case without conflict. To avoid unnecessary repetition, various possible combination manners are not described in the present disclosure.

In addition, different implementations of the present disclosure may also be arbitrarily combined without departing from the idea of the present disclosure, and these combinations shall still be regarded as content disclosed in the present disclosure.

What is claimed is:

1. A battery energy processing device, comprising:
an energy exchange interface;
a first circuit, wherein a first end of the first circuit is connected with the energy exchange interface and a second end of the first circuit is connected with a battery;
a second circuit, wherein a first end of the second circuit is connected with the battery;
an energy storage device, wherein the energy storage device is connected with a second end of the second circuit; and
a controller, configured to: in a first preset state, control the second circuit to charge and discharge the battery to heat the battery, and control the first circuit to receive energy from the energy exchange interface and output the energy to the battery to charge the battery.

2. The battery energy processing device according to claim 1, wherein, in the first preset state, the controller controls the second circuit to charge and discharge the energy storage device and the battery to heat the battery; and
the first circuit is configured to: in the first preset state, stabilize a voltage of the energy exchange interface and cause a voltage transmitted by the first circuit to the battery to match a voltage of the battery in real time.

3. The battery energy processing device according to claim 2, wherein the first circuit comprises:
M-phase bridge arms (B1), wherein a first confluent end of the M-phase bridge arms (B1) is connected with a positive electrode of the battery; and a second confluent end of the M-phase bridge arms (B1) is connected with a negative electrode of the battery;
M coils (KM1), wherein first ends of the M coils (KM1) are connected with midpoints of the M-phase bridge arms (B1) in a one-to-one correspondence and second ends of the M coils (KM1) are connected together; and
a first capacitor (C1), wherein a first end of the first capacitor (C1) is connected with the second ends of the M coils (KM1); a second end of the first capacitor (C1) is connected with the second confluent end of the M-phase bridge arms (B1); the first end of the first capacitor (C1) and the second end of the first capacitor (C1) are respectively connected with the energy exchange interface; and
M≥1.

4. The battery energy processing device according to claim 3, wherein
the second circuit comprises N-phase bridge arms (B2); a first confluent end of the N-phase bridge arms (B2) is connected with the positive electrode of the battery; a second confluent end of the N-phase bridge arms (B2) is connected with the negative electrode of the battery;
the energy storage device comprises N coils (KM2) and a second capacitor (C2); first ends of the N coils (KM2) are connected with midpoints of the N-phase bridge arms (B2) in a one-to-one correspondence; second ends of the N coils (KM2) are connected together; a first end of the second capacitor (C2) is connected with second ends of the N coils (KM2); a second end of the second capacitor (C2) is connected with the second confluent end of the N-phase bridge arms (B2); N≥1; and
in the first preset state, the controller controls the N-phase bridge arms (B2) to cause the second capacitor (C2) to charge and discharge the battery to heat the battery, and controls the M-phase bridge arms (B1) to cause the battery to receive the energy from the energy exchange interface.

5. The battery energy processing device according to claim 4, further comprising a first switch (K1), wherein a first end of the first switch (K1) is connected with the energy exchange interface; a second end of the first switch (K1) is connected with the positive electrode of the battery; and
the controller is further configured to: in a second preset state, control the first circuit to be in a state of not receiving the energy from the energy exchange interface and control the second circuit to be in a state of not causing the energy storage device and the battery to be charged and discharged, and control the first switch (K1) to be closed to cause the battery to receive the energy from the energy exchange interface directly.

6. The battery energy processing device according to claim 4, further comprising a second switch (K2), wherein a first end of the second switch (K2) is connected with the energy exchange interface; a second end of the second switch (K2) is respectively connected with the first end of the second capacitor (C2) and the second ends of the N coils (KM2);
the controller is further configured to: in a third preset state, control the second switch (K2) to be closed, and control lower bridge arms of the N-phase bridge arms (B2) to be closed and opened, to cause the battery to receive the energy from the energy exchange interface, wherein the energy from the energy exchange interface is boosted after passing through the N-phase bridge arms (B2), the N coils (KM2), and the second capacitor (C2) and then received by the battery; and
the controller is further configured to: in the second preset state, control the second switch (K2) to be closed, and control the lower bridge arms of the N-phase bridge arms (B2) to be opened, to cause the battery directly to receive the energy from the energy exchange interface.

7. The battery energy processing device according to claim 4, further comprising a third switch (K3), wherein a first end of the third switch (K3) is connected with the second ends of the N coils (KM2); a second end of the third switch (K3) is connected with the first end of the second capacitor (C2); the N coils (KM2) are motor windings; the N-phase bridge arms (B2) are bridge arm converters; and the controller is further configured to: in a fifth preset state, control the third switch (K3) to be opened, and control the bridge arm converters to cause a motor corresponding to the motor windings to output power.

8. The battery energy processing device according to claim 3, further comprising a fourth switch (K4), wherein a first end of the fourth switch (K4) is connected with the second ends of the M coils (KM1); a second end of the fourth switch (K4) is connected with the first end of the first capacitor (C1); the M coils (KM1) are motor windings; the M-phase bridge arms (B1) are bridge arm converters; and
the controller is further configured to: in a sixth preset state, control the fourth switch (K4) to be opened, and control the bridge arm converters to cause a motor corresponding to the motor windings to output power.

9. The battery energy processing device according to claim 4, wherein
the M coils (KM1) are motor windings of a driving motor or motor windings of a compressor; and
the N coils (KM2) are motor windings of the driving motor.

10. A vehicle, comprising a battery and the battery energy processing device according to claim 1.

11. The battery energy processing device according to claim 3, wherein
the second circuit comprises N-phase bridge arms (B2); a first confluent end of the N-phase bridge arms (B2) is connected with the positive electrode of the battery; a second confluent end of the N-phase bridge arms (B2) is connected with the negative electrode of the battery;
the energy storage device comprises N coils (KM2); first ends of the N coils (KM2) are connected with midpoints of the N-phase bridge arms (B2) in a one-to-one correspondence; second ends of the N coils (KM2) are connected together; N≥2; the N coils (KM2) are motor windings; the N-phase bridge arms (B2) are bridge arm converters;
in the first preset state, the controller controls the N-phase bridge arms (B2) to cause the N coils (KM2) to charge and discharge the battery to heat the battery, and controls the M-phase bridge arms (B1) to cause the battery to receive the energy from the energy exchange interface; and
the controller is further configured to: in a fourth preset state, control the bridge arm converters to cause a motor corresponding to the motor windings to output power.

12. A battery energy processing method, comprising, in a first preset state,
controlling a second circuit to charge and discharge a battery to heat the battery; and
controlling a first circuit to receive energy from an energy exchange interface and output the energy to the battery to charge the battery,
wherein: a first end of the first circuit is connected with the energy exchange interface; a second end of the first circuit is connected with the battery; a first end of the second circuit is connected with the battery; and an energy storage device is connected with a second end of the second circuit.

13. The battery energy processing method according to claim 12,
wherein controlling a second circuit to charge and discharge a battery to heat the battery comprises controlling the second circuit to charge and discharge the energy storage device and the battery to heat the battery, and wherein controlling a first circuit to receive energy from an energy exchange interface and output the energy to the battery to charge the battery comprises controlling the first circuit to stabilize a voltage of the energy exchange interface, and a voltage transmitted by the first circuit to the battery matches a voltage of the battery in real time.

14. The battery energy processing method according to claim 13, wherein the first circuit comprises:
M-phase bridge arms (B1), wherein a first confluent end of the M-phase bridge arms (B1) is connected with a positive electrode of the battery; and a second confluent end of the M-phase bridge arms (B1) is connected with a negative electrode of the battery;
M coils (KM1), wherein first ends of the M coils (KM1) are connected with midpoints of the M-phase bridge arms (B1) in a one-to-one correspondence; and second ends of the M coils (KM1) are connected together; and
a first capacitor (C1), wherein a first end of the first capacitor (C1) is connected with the second ends of the M coils (KM1); a second end of the first capacitor (C1) is connected with the second confluent end of the M-phase bridge arms (B1); M≥1; and
the step of controlling, in the first preset state, the first circuit to receive the energy from the energy exchange interface and output the energy to the battery to charge the battery comprises:
controlling the M-phase bridge arms (B1) to cause the battery to receive the energy from the energy exchange interface.

15. The battery energy processing method according to claim 14, wherein
the second circuit comprises N-phase bridge arms (B2); a first confluent end of the N-phase bridge arms (B2) is connected with the positive electrode of the battery; a second confluent end of the N-phase bridge arms (B2) is connected with the negative electrode of the battery;
the energy storage device comprises N coils (KM2) and a second capacitor (C2); first ends of the N coils (KM2) are connected with midpoints of the N-phase bridge arms (B2) in a one-to-one correspondence; second ends of the N coils (KM2) are connected together; a first end of the second capacitor (C2) is connected with second ends of the N coils (KM2); a second end of the second capacitor (C2) is connected with the second confluent end of the N-phase bridge arms (B2); N≥1; and
the step of controlling, in the first preset state, the second circuit to charge and discharge the energy storage device and the battery to heat the battery comprises:
controlling the N-phase bridge arms (B2) to cause the second capacitor (C2) to charge and discharge the battery to heat the battery.

16. The battery energy processing method according to claim 15, further comprising, in a second preset state,
controlling the first circuit to be in a state of not receiving the energy from the energy exchange interface;
controlling the second circuit to be in a state of not charging and discharging the energy storage device and the battery; and
controlling a first switch (K1) to be closed to cause the battery to receive the energy from the energy exchange interface directly,
wherein a first end of the first switch (K1) is connected with the energy exchange interface, and a second end of the first switch (K1) is connected with the positive electrode of the battery; in a third preset state,
controlling a second switch (K2) to be closed;

controlling lower bridge arms of the N-phase bridge arms (B2) to be closed and opened, to cause the battery to receive the energy from the energy exchange interface, the energy from the energy exchange interface being boosted after passing through the N-phase bridge arms (B2), the N coils (KM2), and the second capacitor (C2) and then received by the battery; and wherein a first end of the second switch (K2) is connected with the energy exchange interface; and a second end of the second switch (K2) is respectively connected with the first end of the second capacitor (C2) and the second ends of the N coils (KM2).

17. The battery energy processing method according to claim 15, further comprising, in the second preset state,
controlling a second switch (K2) to be closed, and
controlling the lower bridge arms of the N-phase bridge arms (B2) to be opened, to cause the battery to receive the energy from the energy exchange interface directly,
wherein a first end of the second switch (K2) is connected with the energy exchange interface, and a second end of the second switch (K2) is respectively connected with the first end of the second capacitor (C2) and the second ends of the N coils (KM2).

18. The battery energy processing method according to claim 15, further comprising, in a fifth preset state,
controlling a third switch (K3) to be opened, and
controlling bridge arm converters to cause a motor corresponding to motor windings to output power,
wherein a first end of the third switch (K3) is connected with the second ends of the N coils (KM2); a second end of the third switch (K3) is connected with the first end of the second capacitor (C2); the N coils (KM2) are the motor windings; and the N-phase bridge arms (B2) are the bridge arm converters.

19. The battery energy processing method according to claim 15, further comprising, in a sixth preset state,
controlling a fourth switch (K4) to be opened, and
controlling bridge arm converters to cause a motor corresponding to motor windings to output power,
wherein a first end of the fourth switch (K4) is connected with the second ends of the M coils (KM1); a second end of the fourth switch (K4) is connected with the first end of the first capacitor (C1); the M coils (KM1) are the motor windings; and the M-phase bridge arms (B1) are the bridge arm converters.

20. The battery energy processing method according to claim 14, wherein
the second circuit comprises N-phase bridge arms (B2); a first confluent end of the N-phase bridge arms (B2) is connected with the positive electrode of the battery; a second confluent end of the N-phase bridge arms (B2) is connected with the negative electrode of the battery;
the energy storage device comprises N coils (KM2); first ends of the N coils (KM2) are connected with midpoints of the N-phase bridge arms (B2) in a one-to-one correspondence; second ends of the N coils (KM2) are connected together;
N≥2;
the step of controlling, in the first preset state, the first circuit to receive the energy from the energy exchange interface and output the energy to the battery to charge the battery comprises:
controlling, in the first preset state, the N-phase bridge arms (B2) to cause the N coils (KM2) to charge and discharge the battery to heat the battery; and
the step of controlling a first circuit to receive energy from an energy exchange interface and output the energy to the battery to charge the battery comprises:
controlling the M-phase bridge arms (B1) to cause the battery to receive the energy from the energy exchange interface.

* * * * *